United States Patent [19]
Bramley

[11] Patent Number: 5,889,563
[45] Date of Patent: Mar. 30, 1999

[54] METHOD AND DEVICE FOR SYCHRONIZING VISUAL INFORMATION WITH AUDIO INFORMATION

[75] Inventor: Richard Bramley, Grenoble, France

[73] Assignee: SGS-Thomson Microelectronics S.A., Saint Genis, France

[21] Appl. No.: 657,898

[22] Filed: Jun. 7, 1996

[30] Foreign Application Priority Data

Jun. 9, 1995 [FR] France .................................. 95 06865

[51] Int. Cl.$^6$ ................................................. H04M 9/475
[52] U.S. Cl. ........................................... 348/515; 370/503
[58] Field of Search ..................... 348/501, 515, 348/845.3; 704/500; 375/362, 503, 516; 395/551, 553; H04N 5/04

[56] References Cited

U.S. PATENT DOCUMENTS

| | | |
|---|---|---|
| 3,971,888 | 7/1976 | Ching et al. . |
| 4,660,079 | 4/1987 | Devimeux et al. . |
| 5,559,999 | 9/1996 | Maturi et al. ........................... 395/550 |

FOREIGN PATENT DOCUMENTS

| | | |
|---|---|---|
| 0577329 | of 0000 | European Pat. Off. . |
| 2648972 | of 0000 | France . |
| 91/11074 | of 0000 | WIPO . |

OTHER PUBLICATIONS

1992 SID International Symposium, May 17, 1992, Boston, MS, pp. 127–129 Maccinnis, "The MPEG System Specification: Multiplex, Coding and Constraints".

*Primary Examiner*—Victor R. Kostak
*Attorney, Agent, or Firm*—Wolf, Greenfield & Sacks, P.C.

[57] ABSTRACT

A method and device for synchronizing visual information encoded in accordance with the MPEG standard, when it is being decoded. A counter of the number of words transmitted to the picture decoder input is read at the time of the arrival of a picture time mark, and its value is stored in a stack in a microcontroller. When it is output from the picture decoder, each start code stops the microcontroller. At the same time a counter of the number of words transmitted from the picture decoder output is read and its value is compared with the value in the stack. When its value exceeds one of the counter values in the stack, the value of the corresponding time mark is assigned to it and can be used for synchronization with the audio signal.

16 Claims, 2 Drawing Sheets

METHOD AND DEVICE FOR SYCHRONIZING VISUAL INFORMATION WITH AUDIO INFORMATION

This invention concerns a method for synchronizing visual information encoded in accordance with the MPEG1 or 2 standard with audio information, when it is being decoded.

When recorded data is acquired, information representing pictures and information representing sound is naturally synchronized.

This synchronization must be maintained during subsequent processing of this information, or it must be restored if it is temporarily lost.

In order to obtain this synchronization, information representing sound and information representing pictures will contain time marks that will either be coincident with each other, or at least will be positioned at specific time intervals from each other, when films are being restored or recreated.

MPEG standards define the conditions under which moving pictures are encoded and decoded.

Digitized picture transmission and storage techniques can significantly improve the quality of the pictures finally obtained, compared with analog transmission. These techniques also have a wider range of applications.

However, direct transmission and storage of moving digitized pictures requires an extremely high information throughput, which in practice makes it necessary to compress and encode these pictures.

Digitized pictures are thus encoded before transmission in order to reduce the quantity of information representing them, and are then decoded after transmission.

Obviously, encoding and decoding techniques are essential for the quality of the final pictures, and it became necessary to standardize them so that the various equipment using these techniques would be compatible.

Thus a group of Experts (the Moving Picture Expert Group—MPEG) developed ISO standard 11172 and ISO IEC standard 13818.

These two standards are often referred to as MPEG1 and MPEG2, and define encoding and decoding conditions for moving pictures, possibly associated with a sound signal, that can be used equally well for the storage and reproduction of pictures, and for their transmission.

Therefore these MPEG standards may be used for the storage of pictures on compact disks, interactive compact disks, magnetic tapes, for the transmission of pictures through LANs or telephone lines, and the transmission of television pictures by radio communications.

Standards completely defining this technique in detail can be obtained from standardization organizations, and reference should be made to them for a detailed description.

Thus when decoding data flows representing moving pictures encoded according to MPEG standards, the transit time for information representing a picture in the decoder is different for different pictures.

Furthermore, in decoding devices it is customary that system information concerning time marks is dissociated from picture information that is being decoded.

Thus during this processing, the synchronization of picture and sound information is lost or at least suffers from uncertainties due to decoding.

The purpose of the invention is to provide a method and a device for the synchronizing visual information with the corresponding sound or audio information.

Accordingly, the invention concerns a method for synchronizing visual information encoded in accordance with the MPEG standard with audio information at the time that it is decoded. Said information contains system information and picture information grouped in packets, the system information including a time mark (PTS) for each picture packet and the information for each picture starts with a start code (PSC). Decoding is controlled by a microcontroller that separates system information from picture information and controls a picture decoder.

According to the invention, a counter of the number of words transmitted to the picture decoder input, is read at the time of arrival of a picture time mark (PTS) and its value is stored in a stack in the microcontroller. When it is output from the picture decoder, each start code stops the microcontroller and at the same time a counter of the number of words transmitted from the picture decoder output is read and its value is compared with the value in the stack. When its value exceeds one of the counter values in the stack, the value of the corresponding time mark (PTS) is assigned to it and can be used for synchronization with the audio signal.

According to a special embodiment of the invention, the microcontroller is external to the decoder.

The invention will be described below in more details with reference to the appended figures:

FIG. 1 shows the flow of compressed information 1, as it appears after application of an MPEG standard. Information 2 representing a picture packet is preceded by system information containing a time mark (PTS) 3 and information representing each picture 4 is preceded by a start code (PSC) 5.

Figure 1:
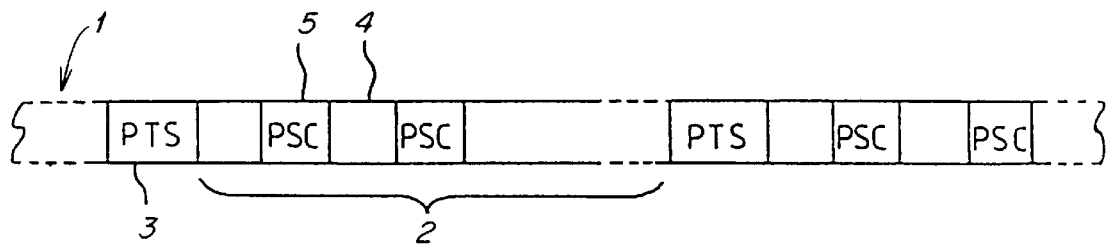
FIG. 1 shows a flow of picture data encoded according to one of the MPEG standards.
Figure 2A:
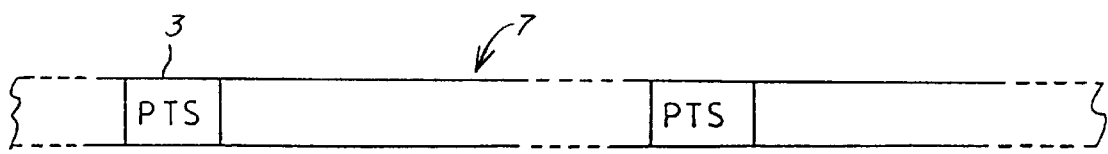
FIG. 2 shows the flow of picture data of FIG. 1 after separation of system data and picture packet data.
Figure 2B:
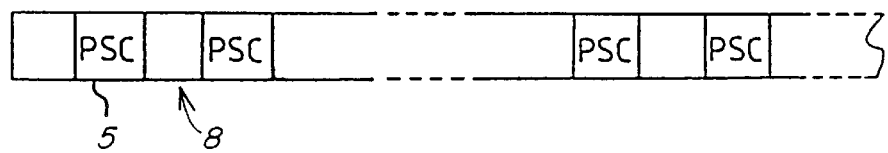
Figure 3:
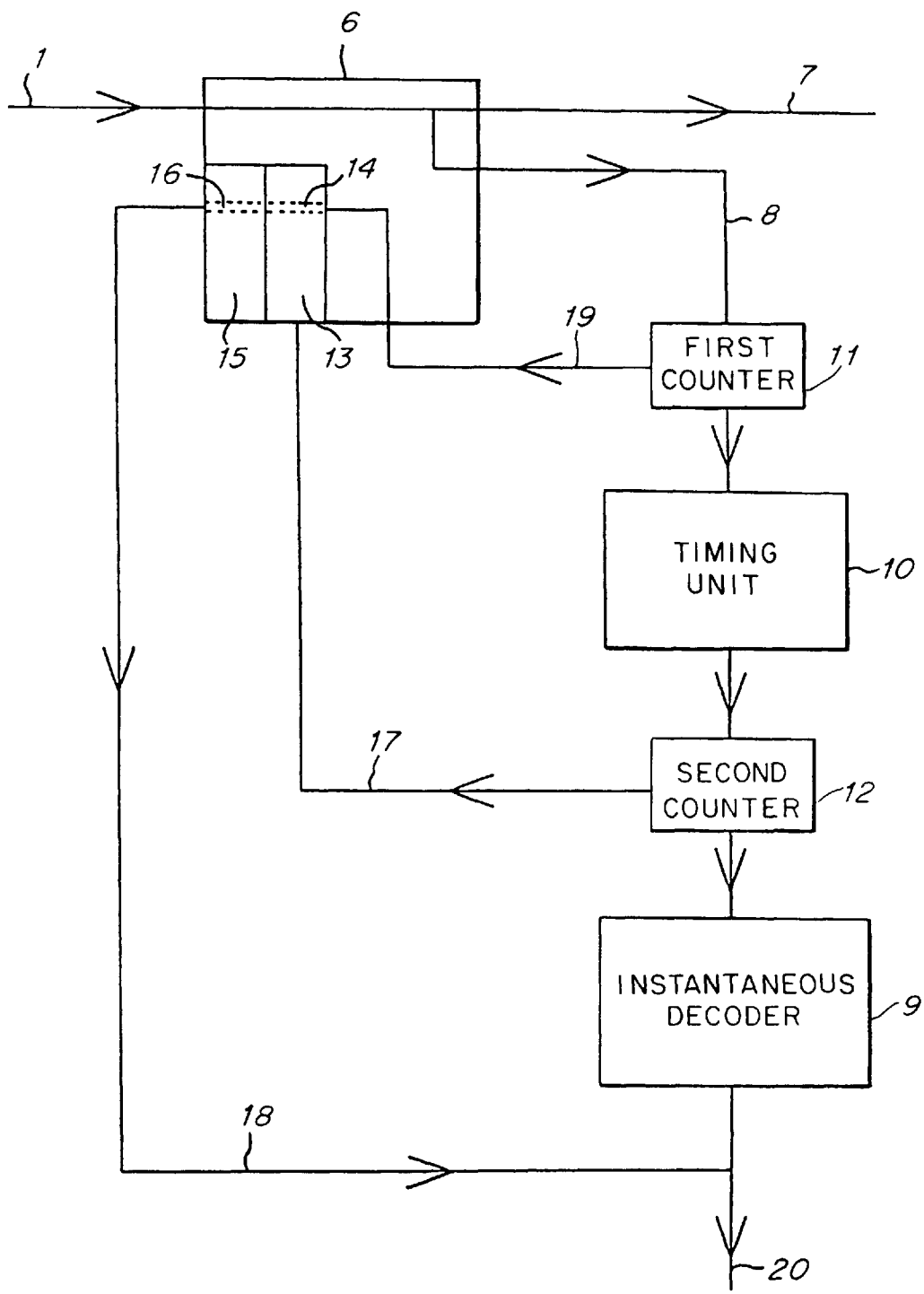
FIG. 3 is a block diagram showing the device according to the invention.

As shown in the preferred embodiment of FIG. 3, at the time of decoding, this information 1 is separated by a microprocessor, which is usually external and divides information 1 into information 7 called the system information and containing time marks 3, and picture information 8 containing start codes (PSC) 5.

This separation is made by the microprocessor 6 to supply the picture information 8 alone to decoder 9, 10.

Therefore this picture information 8, sometimes called pure video information, no longer contains any time marks. The transit time in the decoder 9, 10, however, depends on the picture concerned and its position in the picture packet.

In order to render this phenomena, the real decoder is generally symbolized as two elements, the instantaneous decoder 9 being assumed to act instantaneously, and the timing unit 10 producing a variable delay and often called a "bit buffer".

A first counter 11 placed at the picture decoder input in front of unit 10 counts words transmitted in the picture information 8 and addresses its value 14 to a stack 13 in the microprocessor 6 through line 19. Picture information 8 is preferably transmitted in the form of sixteen bit words and counter 11 is preferably a twenty-four bit counter that therefore outputs the total of words transmitted to the decoder modulo two to the power of twenty-four. Furthermore, since a packet including a time reference was input into microprocessor 6, the value of its time reference 16 is stored in stack 15 and is then associated with the value 14 of the counter recorded in stack 13.

A second counter with the same characteristics as counter 11 is placed at the output from unit 10 and forms a decoder output counter 12.

The value of this counter is compared with the value of the oldest input counter stored in stack 13, through line 17.

When a start code (PSC) appears, the value produced by counter 12 exceeds the value 14 in counter 11 contained in stack 13, the value of the time reference 16 associated with it is assigned by line 18 to the picture output from decoder 9. This produces information 20 representing decoded pictures and time references.

Thus although decoder 9, 10 has not carried any system information, the time mark that was initially assigned to information representing a picture before it was decoded, is also assigned to the information representing the picture after it was decoded.

Advantageously, the microcontroller controlling decoding is external, in other words distinct from the decoder 9, 10 itself. However, these various elements could be included in a single unit.

Advantageously, the microcontroller stack containing the values output by the counter of the number of transmitted words at the decoder input is a first-in first-out (FIFO) type counter.

When it is output from the decoder, each start code (PSC) associated with a picture stops microcontroller 6 so that input codes contained in stack 13 can be compared with the output code supplied by output counter 12 and the time reference 16 can be extracted under the conditions described above.

Time references can be associated with pictures output from the decoder making all desired uses possible, and making it possible to position pictures with respect to sound information data flows that also contain time references.

I claim:

1. A method for synchronizing, at the time of decoding, visual information encoded according to an MPEG standard with audio information the method comprising steps of:
    decoding encoded information, wherein said decoding is performed by a picture decoder and is controlled by a microcontroller;
    separating system information, which includes at least one time mark for each picture packet, and picture information, which includes pictures each of which starts with a start code;
    performing a first count of words transmitted to a picture decoder input;
    upon an arrival of a picture time mark, storing the first count in a stack in the microcontroller
    upon an output from the picture decoder of each start code, ping the microcontroller;
    performing a second count of words transmitted from the picture decoder output;
    comparing the second count with the first count stored in the stack;
    when the second count exceeds the first count, assigning a corresponding time mark to the picture decoder output; and
    using the corresponding time marks for synchronization with the audio signal.

2. A device for synchronizing, during decoding, visual information encoded according to an MPEG standard with audio information, the device comprising:
    a microcontroller controlling decoding, separating picture information grouped in picture packets from system information that includes a time mark for each picture packet, and controlling a picture decoder;
    a first counter of a number of words transmitted to a picture decoder input, wherein the first counter is read on an arrival of a picture time mark, and its value is stored in a stack in the microcontroller;
    a second counter of a number of words transmitted from a picture decoder output, wherein the microcontroller is stopped by each start code, the second counter is read and its value is compared with the value in the stack,
    when the value of the second counter exceeds the value in the stack, a corresponding time mark is assigned to the picture information and may be used for synchronization with the audio information.

3. A synchronization device as described in claim 2, wherein the microcontroller is external.

4. A synchronization device as described in claim 2, wherein the picture information is transmitted as sixteen bit words.

5. A synchronization device as described in claim 4, wherein the first and second counters are twenty-four bit counters.

6. A method for synchronizing audio and visual data when decoding data according to an MPEG standard, comprising steps of:
    receiving compressed data into a microprocessor and producing audio data and visual data;
    when a time mark is detected in said visual data, receiving said visual data into a decoder;
    counting a number of words of said visual data using a first counter as said visual data is received;
    storing contents of said first counter in a stack when said time mark is detected;
    decoding said visual data in said decoder and producing picture data;
    counting a number of words in said picture data using a second counter as said picture data is produced;
    when said time mark is detected in said picture data, comparing contents of said second counter with contents of said stack, and assigning said time mark to a corresponding value in said stack; and
    using said time mark and said corresponding value to synchronize said audio data and said picture data.

7. A system for decoding data according to an MPEG standard, comprising:
    a microprocessor having a first stack, connected to receive compressed data and produce audio data and visual data;
    a first counting circuit connected to count words in said visual data, and to pass a current value of said first counting circuit to said stack when a time mark is detected in said visual data;
    a decoding circuit connected to receive and decode said visual data, and to produce picture data; and
    a second counting circuit connected to count words in said picture data, and to pass a current value of said second counting circuit to said microprocessor when a start code is detected in said picture data;
    wherein said microprocessor synchronizes said audio data and said picture data by assigning a time mark to said picture data.

8. The system of claim 7, wherein said microprocessor is external.

9. The system of claim 3, wherein said picture information is transmitted as 16-bit words.

10. The system of claim 7, wherein said visual data is transmitted as 16-bit words.

11. The system of claim 7, wherein said first counting circuit is a 24-bit counter.

12. The system of claim 7, wherein when said start code is detected in said picture data, said microcontroller is stopped.

13. The method of claim 6, wherein said microprocessor is external.

14. The method of claim 6, wherein said visual data is transmitted as 16-bit words.

15. The method of claim 6, wherein said first counter is a 24-bit counter.

16. The method of claim 6, further comprising a step of stopping said microcontroller when a start code is detected in said picture data.

\* \* \* \* \*